INVENTORS
IRA F. THOMPSON &
ROBERT L. BARBIN
BY
W. A. Sprague
Attorney

INVENTORS
IRA F. THOMPSON &
ROBERT L. BARBIN
BY
[signature]
Attorney

United States Patent Office
3,495,124
Patented Feb. 10, 1970

3,495,124

COLOR TELEVISION DISPLAY SYSTEM WITH REDUCED PINCUSHION DISTORTION

Ira F. Thompson and Robert L. Barbin, Indianapolis, Ind., assignors to RCA Corporation, a corporation of Delaware Filed Apr. 6, 1966, Ser. No. 540,615
Int. Cl. H01j 29/50, 31/06
U.S. Cl. 315—13 2 Claims

ABSTRACT OF THE DISCLOSURE

This invention relates to a three gun color television display apparatus where the blue electron gun is located below the tube axis in order to reduce pincushion distortion without the necessity of additional pincushion apparatus.

This invention relates to color television display apparatus and particularly to an arrangement of the reproducing apparatus in relation to the viewer.

Most color television receivers employ a shadow mask type of picture tube for the reproduction of an image. Such a picture tube has a phosphor screen disposed on the inner surface of the end faceplate which conventionally has a somewhat curved outer surface. Because of this curvature, an image observed from a point angularly displaced from the central axis of the picture tube has some apparent pattern distortion. This distortion is such that straight lines appear to be curved. The character of this line curvature depends upon both the viewing angle and the part of the picture in which the lines appear. For example, if the viewing angle is above the central tube axis, the horizontal lines at the top of the picture appear concave upwardly. This is termed pincushion distortion. Also, from the same viewing angle the horizontal lines at the bottom of the picture appear convex downwardly. This is called barrel distortion.

By virtue of the relatively wide angle through which the electron beams are deflected to scan a raster on the picture tube screen surface which is only slightly curved, an additional pincushion type of pattern distortion occurs even when the picture is viewed from the central axis of the tube. In some of the earlier wide angle color picture tubes of the shadow mask variety, additional apparatus and energizing circuits therefor were provided to overcome any pincushion distortion of the raster produced by the scanning operation.

It has been found feasible to design beam deflection yokes in a way to minimize the pincushion distortion of the raster resulting from the scanning operation. Nevertheless, by reason of the particular arrangement of the electron gun structure of the shadow mask type of color picture tube heretofore used, the use of a yoke which minimizes total pincushion distortion leaves some which is not symmetrical at the top and bottom of the reproduced picture. This situation, coupled with the current styling trend which locates the center of the picture tube below the normal eye level of the viewer, accentuates such asymmetry.

An object of the present invention, therefore, is to so orient the shadow mask color picture tube and its electron gun structure that, when a deflection yoke of a character requiring no additional pincushion correction is used, the reproduced picture, when viewed from an angle above the central axis of the tube, has no appreciable raster distortion and appears symmetrical.

In accordance with the invention, the shadow mask color picture tube with its three electron gun structure is mounted in the receiver cabinet so that the part of the tube face which heretofore has been disposed at the top now is located at the bottom. This not only rotates the viewing screen of the tube by 180°, but also effects a similar reorientation of the electron gun structure. When such a tube, mounted in this manner, is provided with a deflection yoke which embodies a design requiring no additional pincushion correction apparatus, a picture is produced which appears to have no appreciable pincushion distortion when viewed from a slightly elevated angle.

For a more detailed explanation of the apparatus embodying the invention, reference may be had to the following description which is taken in conjunction with the accompanying drawings of which:

Figures 1, 2A, 2B:
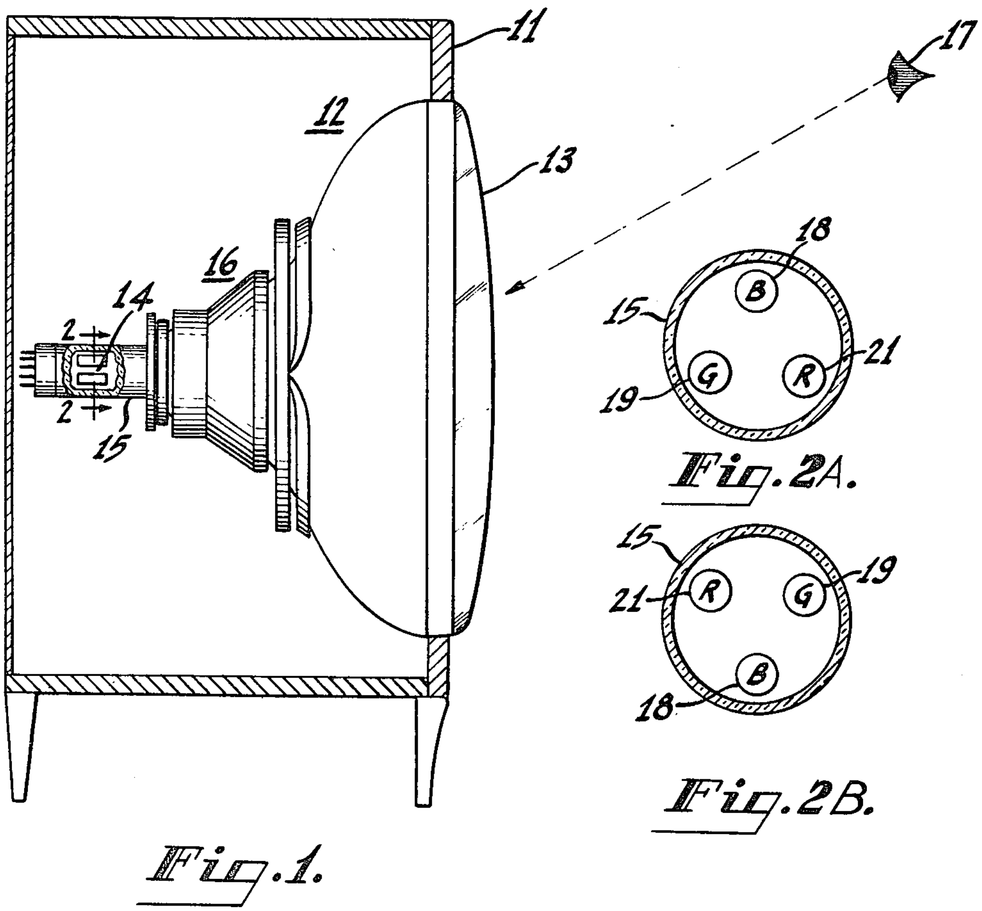
FIGURE 1 is a side elevational view of a color picture tube mounted in a receiver cabinet.
FIGURE 2A is a fragmentary cross-sectional view taken on the line 2—2 of FIGURE 1 showing the prior art or conventional orientation of the electron gun structure of the picture tube.
FIGURE 2B is a view similar to that of FIGURE 2A showing the electron gun orientation in accordance with this invention.

In FIGURE 1 a color television receiver cabinet 11 houses a color television picture tube 12. This tube is of the well-known shadow mask variety, having a substantially rectangular viewing screen (not shown) on the inside surface of a curved faceplate 13. The tube is provided with an electron gun structure 14 housed in the neck 15 of the tube and with a deflection yoke 16 for deflecting the electron beams relative to the viewing screen. As indicated in this figure, the image formed on the viewing screen is observed from a point 17 located somewhat above the central horizontal axis of the tube.

According to prior art teachings, the picture tube 12 is located in the cabinet 11 so that the electron gun structure is oriented as shown in FIGURE 2A. In this arrangement the blue gun 18 is located at one apex of an equilateral triangle, at the other lower apices of which are located the green and red guns 19 and 21 respectively. These guns are symmetrically located about the central axis 22 of the picture tube. It is to be noted that the downward vertical displacement of the green and red guns 19 and 21 respectively is only one-half of the upward vertical displacement of the blue gun 18 from the central axis 22.

In FIGURE 2B the electron gun orientation is rotated 180° from that shown in FIGURE 2A. In this case, the blue gun 18 is located below the green and red guns 19 and 21 respectively. The respective vertical displacements of these guns from the central axis 22 is the same in magnitude but opposite in direction to the corresponding vertical displacements of the guns in FIGURE 2A.

The yoke 16 of FIGURE 1 is designed to minimize any pincushion distortion of the picture caused by the scanning operation. Such a yoke also is made so as to have substantially no coma, thereby obviating the need for correcting circuits to register the blue raster with the red and green rasters as in some prior art apparatus. A yoke designed in such a manner does, however, have some negative horizontal isotropic astigmatism which produces the asymmetrical residual pincushion distortion of the raster previously referred to.

Figure 4:
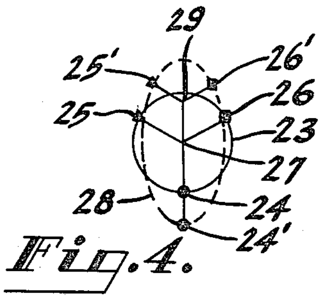
FIGURE 4 is a diagrammatic illustration of some of the effects of a beam deflection yoke with negative horizontal isotropic astigmatism on the three electron beams.

FIGURE 4 illustrates the manner in which negative horizontal isotropic astigmatism produces such asymmetrical pincushion distortion. The solid line circle 23 represents the locus of the unconverged blue, green and red spots 24, 25 and 26 respectively produced with a picture tube and gun orientation such as shown in FIGURE 2A and as viewed from the front of the tube 12. Convergence of the spots 24, 25 and 26 will occur at the central point 27. Any horizontal deflection of the three beams by a yoke having negative horizontal astigmatism moves each of the blue, green and red spots vertically outward and the green and rep spots horizontally inward relative to the central point 27. This places the blue, green and red spots 24', 25' and 26' respectively on a locus represented by the broken line ellipse 28. The three beams producing these spots are converged by apparatus which moves each of the three beams radially with reference to the positions of the electron guns in the tube neck, thereby causing the blue beam to move vertically and the red and green beams to move at 120° respectively relative to the direction of the blue beam motion. Therefore, convergence of the spots 24', 25' and 26' will occur at the eccentric point 29 which is verticaly displaced from the central point 27.

Figure 3:
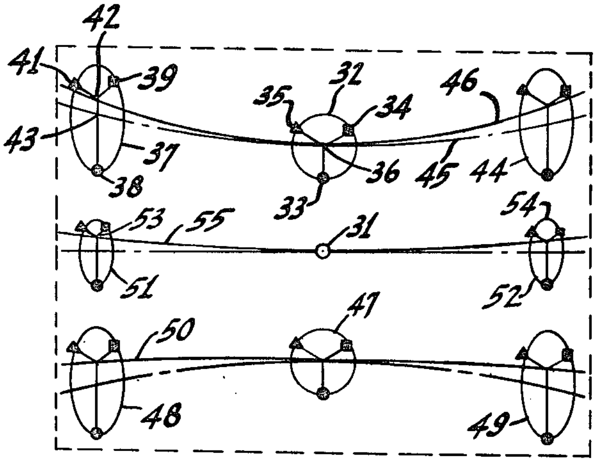
FIGURE 3 is a diagram indicating the effects on the viewing screen of an electron gun orientation according to the prior art teaching.

FIGURE 3 illustrates the manner in which the described asymmetrical raster distortion results from the use of a pincushion corrected deflection yoke having negative horizontal isotropic astigmatism. A graphical representation (exaggerated for explanatory purposes) of the pattern produced on the viewing screen as viewed from the front of the picture tube is given for three horizontal lines of a scanned raster. One line is located near the top, another near the bottom and a third midway between the top and bottom edges of the scanned raster. It is to be understood that the patterns indicated in FIGURE 3 are presented assuming that the landings of the three beams from the red, green and blue guns are converged to a single point 31 at the center of the picture. This convergence is accomplished in the usual manner by static means. Also, there is no dynamic convergence of the beams applied in any of their deflected positions. Consequently, at the other points on the screen the three beams are shown as not converged. In the grouping 32 shown at the top central part of the raster, the blue beam landing spot 33, the red beam landing spot 34 and the green beam landing spot 35 are symmetrically disposed about the center 36 of the group. Consequently, when dynamic convergence is applied to the beams producing such a grouping, all three of the spots 33, 34 and 35 move inwardly radially to converge at the point 36.

In the grouping 37 in the upper lefthand corner of the display, the blue beam landing spot 38 is displaced vertically downward more than the green and red beam landing spots 39 and 41 respectively are displaced vertically upward. The grouping 37, consequently, has an elliptical shape caused by the deflection yoke which has some negative horizontal isotropic astigmatism, as explained in connection with FIGURE 4. As a consequence, when the three beams producing the spots 38, 39 and 41 are dynamically converged, this convergence ocurs at a point 42. In the absence of the described astigmatism of the deflection yoke, the three spots 38, 39 and 41 would be converged at a point 43. A similar situation exists at the right of the screen with the grouping 44. The broken line 45 represents the pincushion type of raster distortion which would be present at the top of the picture, were it not for the described yoke astigmatism. However, the solid line 46 represents the actual array of beam-excited phosphor dot trios across a single horizontal line of the picture at the top with the described apparatus.

Applying the same analysis to the lower part of the picture it is seen that the grouping 47 at the middle of the bottom line of the picture is quite symmetrical, corresponding to the grouping 32 at the top of the picture. In the lower lefthand grouping 48, it is seen that it has the same elliptical type of distortion as that of the grouping 37. Similarly, the lower righthand grouping 49 is like the grouping 44. The solid line 50 represents the pincushion distortion of the lower part of the raster when all three of the beams are dynamically converged over the entire line. It should be noted that the pincushion distortion represented by the line 50 is somewhat less than that represented by the line 46 at the upper part of the raster.

In the horizontal line midway between the top and bottom of the picture, the effect of the horizontal deflection of the three beams by a yoke having the described negative horizontal astigmatism is to produce elliptical spot groupings 51 and 52. When the red, green and blue spots of these groupings are converged respectively, at points 53 and 54, the resultant center line 55 is bowed with the ends thereof upward.

The foregoing description has been given on the premise that there is no vertical astigmatic distortion in groupings 32 and 47. If, however, either positive or negative vertical astigmatism were present, the shape of the grouping 32, for example, would be elliptical with the major axis being vertical (for positive astigmatism) or horizontal (for negative astigmatism). In the case of positive vertical astigmatism, the converged point of the spots 33, 34 and 35 would be above the point 36 of FIGURE 3. In the case of negative vertical astigmatism, the converged point of the spots 33, 34 and 35 would be below the point 36. Such vertical astigmatism would, of course, affect the corner groupings 37 and 44 in a similar manner. The result of the described horizontal astigmatism and any vertical astigmatism would be the displacement of the top horizontal line 46 either upward or downward but with no change in its illustrated and described shape. Similar vertical displacements of the bottom line 50, and all other lines except the middle line 55 would result from both horizontal and vertical astigmatism in the deflection yoke.

Figure 5:
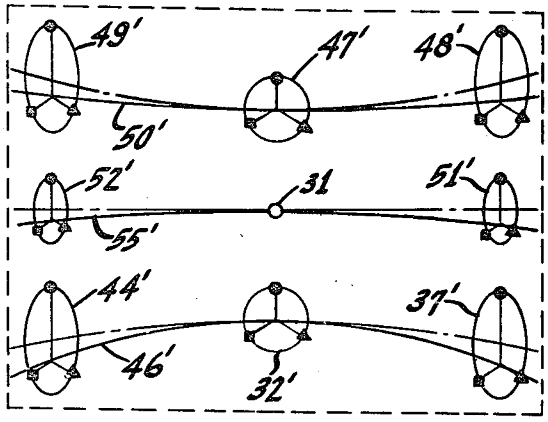
FIGURE 5 is a diagrammatic representation of the results produced on the viewing screen by means of the apparatus embodying the present invention.

FIGURE 5 illustrates the beneficial effects produced by the arrangement of this invention by inverting the color picture tube, together with its electron gun structure, and by deflecting the beams by a yoke which has a controlled amount of negative isotropic astigmatism in the horizontal coils, thereof. It may be seen from a comparison of FIGURES 3 and 5 that the groupings 32', 37', 44', 47', 48', 49', 51' and 52' respectively of FIGURE 5 are the inverse of the described groupings 32, 37, 44, 47, 48, 49, 51 and 52 of FIGURE 3. The result of this arrangement is that the converged line of spots 46' of FIGURE 5 corresponds with the converged line of spots 46 of FIGURE 3. Similarly, the converged line 50' of FIGURE 5 corresponds with the line 50 of FIGURE 3 and the line 55' of FIGURE 5 corresponds with the line 55 of FIGURE 3. Thus, the greater pincushion distortion of the raster now appears at the bottom of the picture and the lesser distortion appears at the top of the picture. Consequently, when the picture is viewed on the curved screen of the picture tube from a point above the central horizontal axis of the tube, the pincushion distortion resulting from such a viewing angle effectively compensates for the relatively small distortion of the upper part of the picture and also of the relatively greater distortion at the bottom of the picture. Thus, all horizontal lines of the picture appear straight.

It will be evident to those skilled in the art that a yoke having the properties previously described, may have numerous forms. One example of such a yoke is disclosed in a concurrently filed United States patent application of Robert L. Barbin, Ser. No. 540,616, titled Electromagnetic Deflection Yoke.

What is claimed is:

1. In a color television receiver, the combination comprising:

a cathode ray picture tube having a luminescent screen at its curved front end and an electron gun array at its rear end;

said electron gun array comprising three electron guns disposed respectively at the apices of an equilateral triangle such that a first two of said guns are located at the same horizontal level on one side of the central longitudinal axis of said tube and the third one of said guns is vertically displaced from said first two guns on the other side of said tube axis;

means including a deflection yoke for deflecting said beams and for producing a composite raster at said luminescent screen having minimum pincushion distortion, and substantially no coma but some negative horizontal isotropic astigmatism, whereby said composite raster has unequal top and bottom pincushion distortion; and means for positioning said picture tube so that said first two guns are located above said tube axis and said third gun is located below said tube axis so as to place the edge of said picture raster with the greater pincushion distortion remote from the viewing position, thereby to compensate for said angular viewing through said curved endplate and to make substantially all of the lines in said picture raster appear straight.

2. In a color television receiver, the combination as defined in claim 1 wherein:

said three electron guns are directed respectively to excite red, green and blue light producing phosphors; and said blue phosphor exciting gun is located below said tube axis.

References Cited

UNITED STATES PATENTS

| | | | |
|---|---|---|---|
| 2,875,374 | 2/1959 | Cooper et al. | 315—13 |
| 2,880,363 | 3/1959 | Schlesinger | 315—13 |
| 2,915,672 | 12/1959 | Schwartz et al. | 315—13 |
| 2,987,647 | 6/1961 | Armstrong | 315—13 |

RODNEY D. BENNETT, Jr., Primary Examiner

M. F. HUBLER, Assistant Examiner